(12) United States Patent
Nielsen et al.

(10) Patent No.: US 10,093,524 B2
(45) Date of Patent: Oct. 9, 2018

(54) AIR PRESSURE CONTROLLER

(71) Applicant: Paratech, Incorporated, Frankfort, IL (US)

(72) Inventors: Kenneth E. Nielsen, Chicago, IL (US); George Roxton, Homer Glen, IL (US); William O. Teach, Frankfort, IL (US)

(73) Assignee: Paratech, Incorporated, Frankfort, IL (US)

( * ) Notice: Subject to any disclaimer, the term of this patent is extended or adjusted under 35 U.S.C. 154(b) by 83 days.

(21) Appl. No.: 15/130,335

(22) Filed: Apr. 15, 2016

(65) Prior Publication Data

US 2017/0297878 A1    Oct. 19, 2017

(51) Int. Cl.
*B66F 3/25* (2006.01)
*G05D 16/10* (2006.01)

(52) U.S. Cl.
CPC ............. *B66F 3/25* (2013.01); *G05D 16/103* (2013.01)

(58) Field of Classification Search
None
See application file for complete search history.

(56) References Cited

U.S. PATENT DOCUMENTS

| 3,411,523 A * | 11/1968 | Lapera ............... G05D 16/0619 137/116.5 |
| 5,040,563 A * | 8/1991 | Wood .................... B05B 7/2405 137/524 |
| 6,654,973 B2 * | 12/2003 | Van Den Heuvel ........ A61G 1/0567 254/93 R |
| 2009/0314360 A1 * | 12/2009 | Checiches .............. G05D 16/10 137/505 |

\* cited by examiner

*Primary Examiner* — Joseph J Hail
*Assistant Examiner* — Brian D Keller
(74) *Attorney, Agent, or Firm* — Banner & Witcoff, Ltd.

(57) ABSTRACT

An air pressure controller having an inlet and an outlet, the controller may be configured to reduce air pressure between the inlet and the outlet and includes an exhaust port configured to exhaust air if a pressure at the outlet rises above a predetermined level.

21 Claims, 13 Drawing Sheets

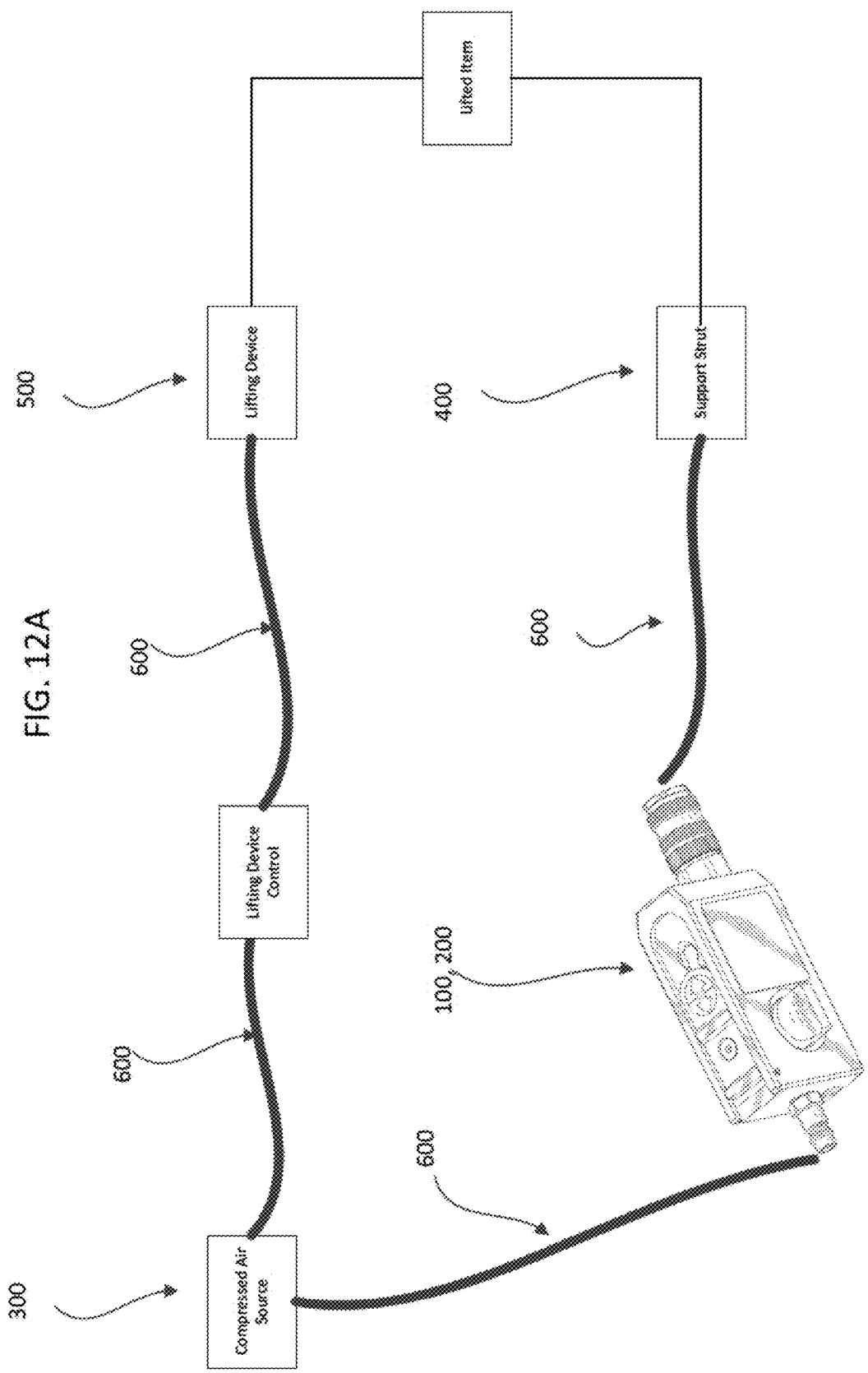

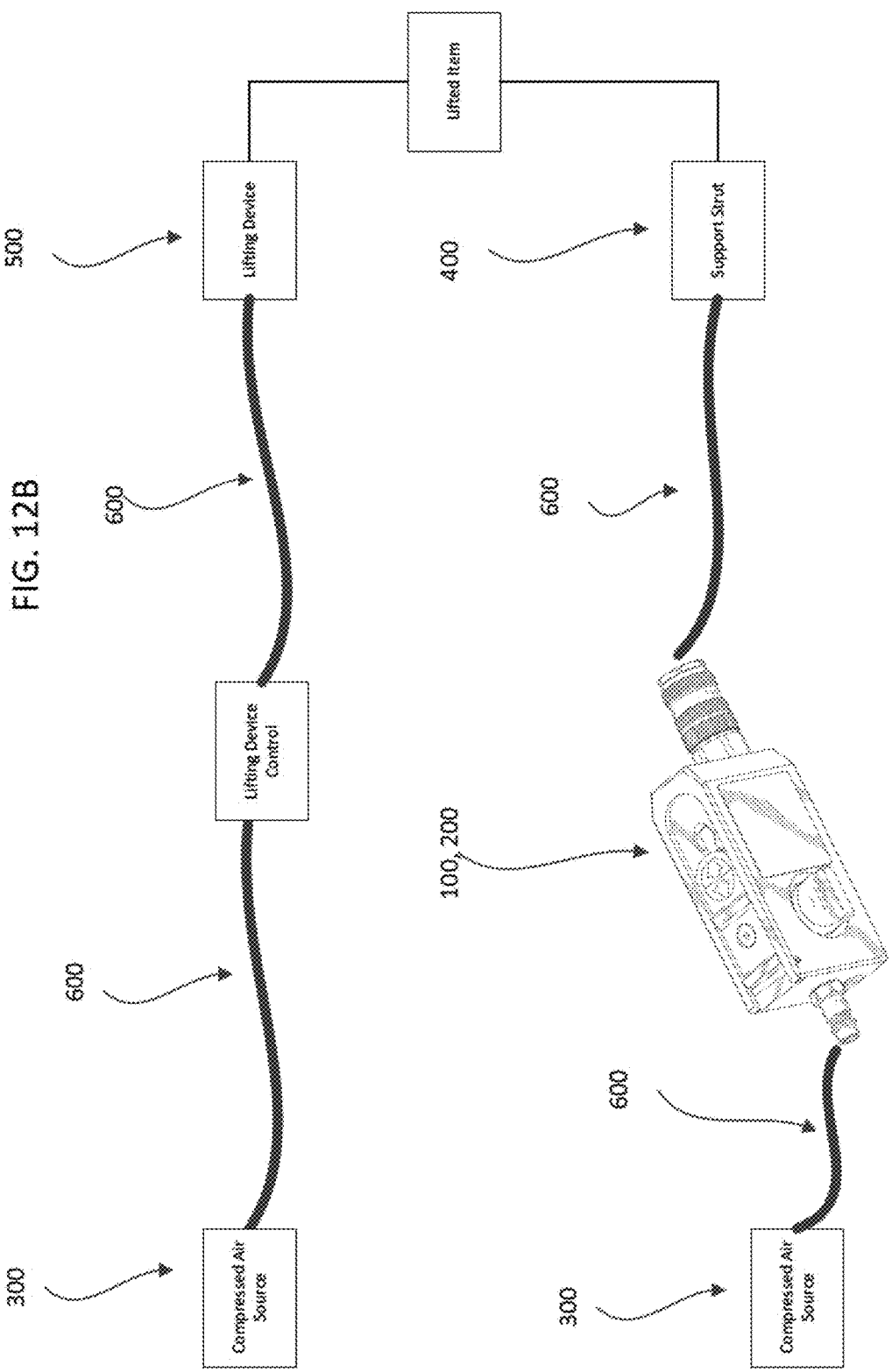

AIR PRESSURE CONTROLLER

BACKGROUND

As is generally known, struts may be utilized to brace or support an unstable structure. For example, one or more struts may be positioned to brace one or more unstable structures of a vehicle following an accident. Struts may be used in a wide variety of other applications. In other examples, one or more struts may be used to support damaged structures within a ship or may be positioned to bear part, or all, of a weight of one or more of a wall, a ceiling, or a roof of an unstable structure. In certain examples, the vehicle, structure, or other object being supported or braced may be lifted or repositioned by, for example, responders to a scene of an accident. In such examples, the strut needs to be extended to continue to act as a brace/support for the object, to prevent undesired shifting or movement of the object.

In other applications struts may be used to lift or move a structure. For example, in some embodiments struts can be used to open a trench after a trench collapse. In such situations the strut must exert significant force to move or lift the collapsed trench through, for example, a highly pressurized strut. To exert such a force, the strut may be coupled to a compressed air device which may allow the strut to exert the force necessary to move or lift the collapsed trench. However, such a system may not be suitable for bracing or supporting applications, or the controlled readjustment of the strut in such applications. For example, such systems may not allow or easily facilitate the readjustment of the strut if an object shifts to, for example, put additional weight or stress upon the strut. Such systems may also result in improperly charged or dangerously pressurized struts if an object shifts such that it is no longer putting weight upon the strut.

Accordingly, a need exists for a controller that may be coupled to a compressed air device and a strut, and may be configured to safely and easily allow the readjustment of a strut, for example the relative extension of a telescoping portion of the strut, in relation to a shifting or moving object that is being braced or supported by the strut.

BRIEF SUMMARY

One or more of the above-mentioned needs in the art are satisfied by aspects described herein. According to one aspect, an air pressure controller configured to, inter alia, reduce air pressure from a source of compressed air or between an air inlet ("inlet air pressure") and an air outlet ("outlet air pressure") is disclosed.

According to another aspect, an air pressure controller configured to reduce air pressure from a source of compressed air is disclosed. The air pressure controller may include an inlet fluidly connected to an inlet conduit and a high pressure chamber, an outlet fluidly connected to an outlet conduit and a low pressure chamber, an exhaust port fluidly connected to an exhaust conduit, and the exhaust conduit fluidly connected to the outlet conduit, and an air pressure control adjustment device configured to adjust the pressure of the air at the outlet port to a substantially steady outlet air pressure. The controller may be configured to vent air through the exhaust port if the air pressure within the outlet conduit exceeds an exhaust air pressure.

The air pressure control adjustment device may be configured to adjust the exhaust air pressure. The outlet air pressure may be less than the exhaust air pressure. The outlet air pressure may be in the range of about 0 psi to about 15 psi, and the exhaust air pressure may be in the range of about 0 psi to about 5 psi above the outlet air pressure. The air pressure control adjustment device may be slidably actuatable.

The air pressure controller may also include a first piston engaged at a first end with a first compression element and engaged at a second end with a second piston, the first piston located within the high pressure chamber and extending into the low pressure chamber; the second piston engaged at a first end with a second compression element and engaged at second end with the first piston; the second compression element engaged at a first end with the second piston and engaged at a second end with an adjustment block.

The air pressure controller may also include an exhaust piston disposed at least partially within the exhaust conduit, the exhaust piston engaged at a first end with an exhaust compression element; the exhaust compression element engaged at a first end with the exhaust piston and engaged with the adjustment block at a second end.

The movement of the air pressure control adjustment device may be configured to move the adjustment block. The adjustment block may include a declined surface engaged with a correspondingly inclined surface of the air pressure control adjustment device, and wherein the adjustment block and the air pressure control adjustment device are configured such that generally lateral movement of the air pressure adjustment device moves the adjustment control block in a generally vertical direction.

The first piston, the second piston, and the exhaust piston may be substantially centered along a line. Additionally, the exhaust piston may extend into the second piston; and the exhaust conduit may extend through the second piston.

The air pressure controller may also include an on/off switch configured to selectively connect air flow from the inlet to the high pressure chamber.

According to another aspect, an air pressure controller configured to reduce air pressure from a source of compressed air is disclosed. The controller may include an inlet fluidly connected to an inlet conduit and a high pressure chamber; an outlet fluidly connected to an outlet conduit and a low pressure chamber; an exhaust port fluidly connected to an exhaust conduit, and the exhaust conduit fluidly connected to the outlet conduit; an air pressure control adjustment device configured to adjust the pressure of the air at the outlet port to a substantially steady outlet air pressure. The controller may also include a first piston engaged at a first end with a first compression element and engaged at a second end with a second piston, the first piston located within the high pressure chamber and extending into the low pressure chamber, the second piston engaged at a first end with a second compression element and engaged at second end with the first piston, the second compression element engaged at a first end with the second piston and engaged at a second end with an adjustment block. The controller may be configured such that movement of the air pressure control adjustment device is configured to move the adjustment block. The controller may also be configured to vent air through the exhaust port if the air pressure within the outlet conduit exceeds an exhaust air pressure.

The air pressure controller may also include an exhaust piston disposed at least partially within the exhaust conduit, the exhaust piston engaged at a first end with an exhaust compression element; the exhaust compression element engaged at a first end with the exhaust piston and engaged with the adjustment block at a second end.

The adjustment block may include a declined surface engaged with a correspondingly inclined surface of the air pressure control adjustment device, and wherein the adjustment block and the air pressure control adjustment device are configured such that generally lateral movement of the air pressure adjustment device moves the adjustment control block in a generally vertical direction.

The first piston, the second piston, and the exhaust piston may be substantially centered along a line. Additionally, the exhaust piston may extend into the second piston; and the exhaust conduit may extend through the second piston.

The air pressure control adjustment device may be configured to adjust the outlet air pressure and the exhaust air pressure. The outlet air pressure may be less than the exhaust air pressure.

According to another aspect, a system for supporting a structure is disclosed. The system may include at least one source of compressed air; at least one strut fluidly engaged with the at least one source of compressed air; and an air pressure controller fluidly engaged with and between the at least one source of compressed air and the at least one strut, the controller configured to reduce air pressure from the at least one source of compressed air provided to the at least one strut. The air pressure controller may include an inlet fluidly connected to an inlet conduit and a high pressure chamber, the inlet conduit fluidly engaged with the at least one source of compressed air; an outlet fluidly connected to an outlet conduit and a low pressure chamber, the outlet conduit fluidly engaged the at least one strut; an exhaust port fluidly connected to an exhaust conduit, and the exhaust conduit fluidly connected to the outlet conduit; an air pressure control adjustment device configured to adjust the pressure of the air at the outlet port to a substantially steady outlet air pressure and provide an internal pressure of the strut substantially equal to the substantially steady outlet air pressure. The controller may include an exhaust port configured to release air if a force is exerted on the at least one strut that is greater than a predetermined force. The strut may include an extendable member configured to extend whenever the force of the structure upon the strut is less than the provided strut internal pressure. The air pressure control adjustment device may be slidably actuatable or rotationally actuatable.

The system may also include at least one lifting device fluidly engaged with a source of compressed air, wherein the at least one lifting device is configured to supply substantially all force necessary to lift the structure.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosures are illustrated by way of example and not limited in the accompanying figures in which like reference numerals indicate similar elements and in which:

FIG. 12A depicts a lifting or moving system including an air pressure controller device according to one or more aspects described herein.

FIG. 12B depicts a lifting or moving system including an air pressure controller device according to one or more aspects described herein.

Figure 1:
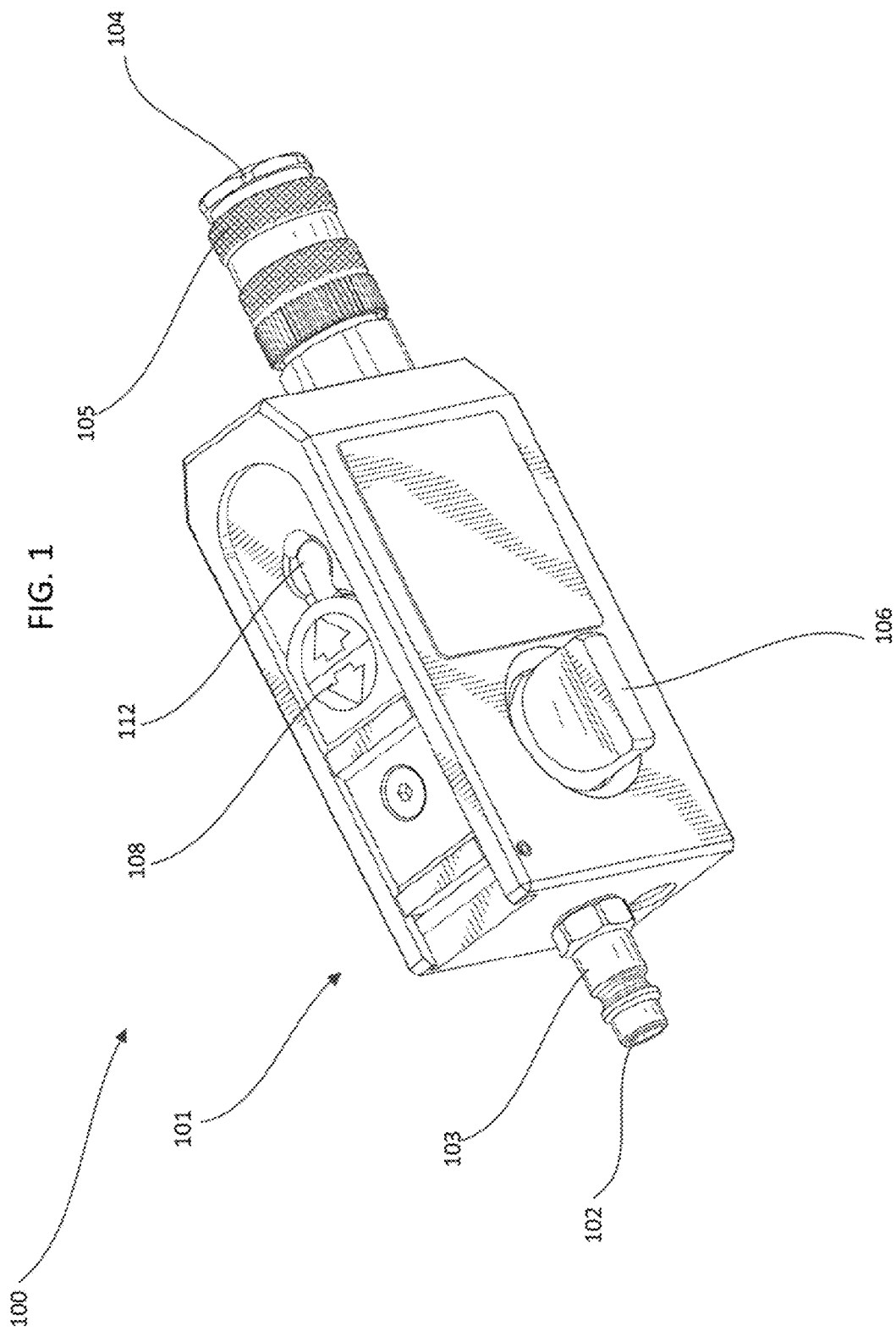
FIG. 1 depicts an isometric view of an air pressure controller device, according to one or more aspects described herein.
Figure 2:
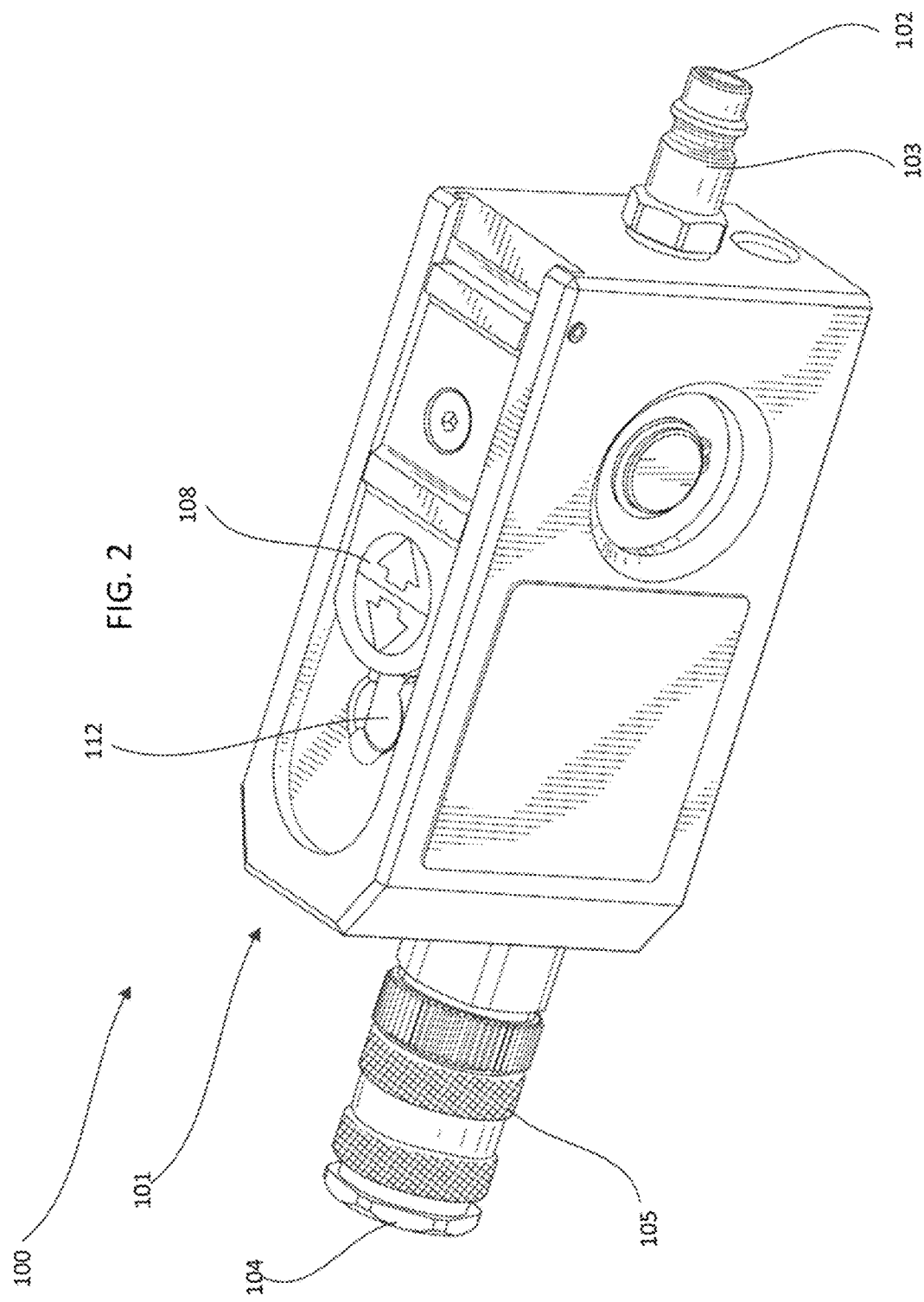
FIG. 2 depicts an isometric view of an air pressure controller device, according to one or more aspects described herein.
Figure 3:
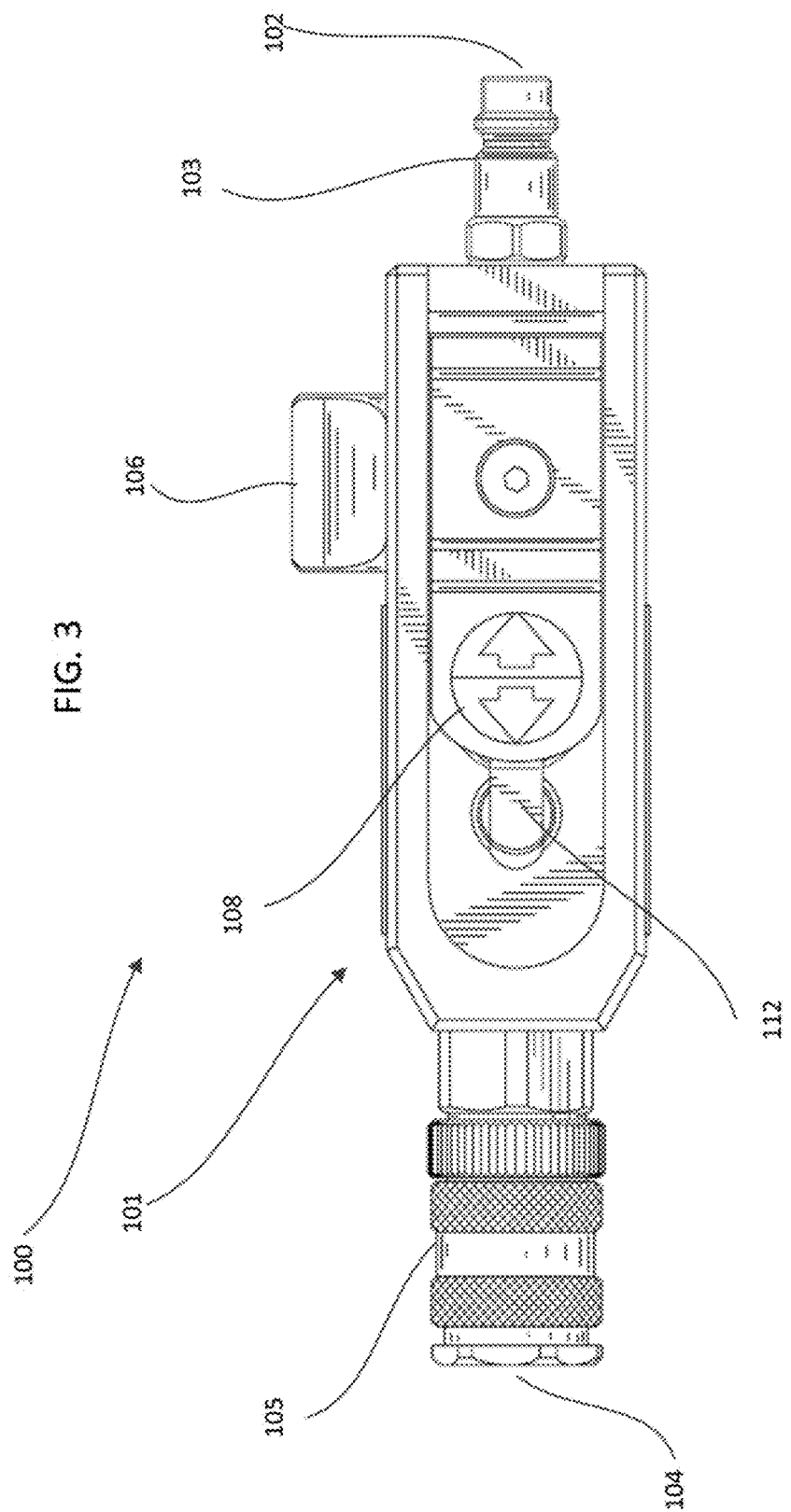
FIG. 3 depicts top view of an air pressure controller device, according to one or more aspects described herein.
Figure 4:
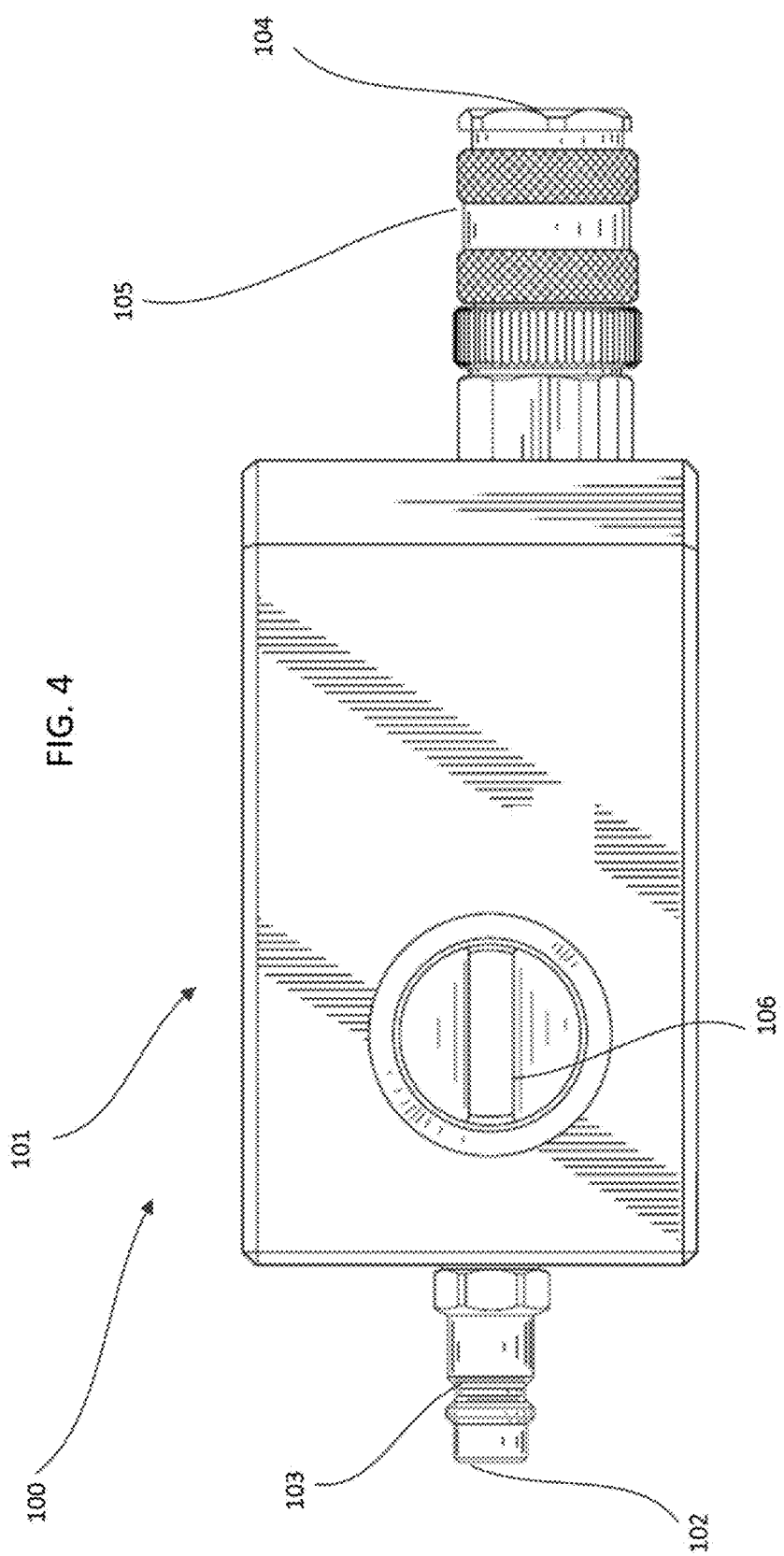
FIG. 4 depicts side view of an air pressure controller device, according to one or more aspects described herein.

Further, it is to be understood that the drawings may represent the scale of different elements of one single embodiment; however, the disclosed embodiments are not limited to that particular scale.

DETAILED DESCRIPTION

While this invention is susceptible of embodiments in many different forms, there are shown in the drawings and will herein be described in detail exemplary embodiments of the invention with the understanding that the present disclosure is to be considered as an exemplification of the principles of the invention and is not intended to limit the broad aspects of the invention to the embodiments illustrated. It is to be understood that other embodiments may be utilized, and structural and functional modifications may be made, without departing from the scope and spirit of the present disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "upward," "downward," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this disclosure relate to an air pressure controller device which can in some embodiments be configured for use with one or more struts in bracing or supporting application. According to various aspects and embodiments, the air pressure controller may be formed of one or more of a variety of materials, such as metals (including metal alloys), plastics, polymers, and composites, and may be formed in one of a variety of configurations, without departing from the scope of the invention.

The various figures in this application illustrate examples of an air pressure controller according to this disclosure. When the same reference number appears in more than one drawing, that reference number is used consistently in this specification and the drawings refer to the same or similar parts throughout.

FIGS. 1-4 depict external views an exemplary air pressure controller 100 according to this disclosure. The air pressure controller 100 may include a housing 101 having an air inlet 102, an air inlet fitting or nipple 103, an air outlet 104, and an air outlet fitting or coupling 105. The housing 101 as shown in FIGS. 1-4 is substantially cuboidal in shape. However, the housing 101 may be embodied with alternative geometries without departing from the scope of the disclosures herein including, for example, prismoidally shaped.

As will be described in more detail below, during use the air inlet 102 may be fluidly engaged with a compressed air device that may provide one or more compressed gases (e.g. air, oxygen, nitrogen, helium, among others) to the controller 100. Additionally, as will be described in more detail below, during use the air outlet 104 may be fluidly engaged with a strut, hydraulic ram, or other device that may be used to support or brace a structure.

The compressed gas may be fluidly connected between the compressed air device, the controller 100, and strut through, for example, gas lines or compressed air hoses. The inlet nipple 103 and outlet coupling 105 may be configured to receive a coupling device such as coupling devices used with compressed air hoses. As such, various configurations of the inlet nipple 103 and the outlet coupling 105 (e.g. industrial standard air coupling configurations, among others) may be utilized without departing from the scope of this disclosure. In some embodiments, the inlet and outlet fittings 103, 105 may be integral with the housing 101. In other embodiments, however, the inlet and outlet fittings 103, 105 may be separate pieces attached to the housing, for example, using a threaded connector.

The controller 100 may also include a switch 106. The switch 106 may be selectively operable to allow air through the controller 106. The switch 106 may have an "on" position wherein air from the air inlet 102 may travel through the controller 100 and an "off" position wherein air from the air inlet 102 does not travel through the controller 100. Although the switch 106 is shown as a rotational switch any suitable device may be used including, for example, a toggle switch.

The controller 100 may also include an air pressure control adjustment 108. The air pressure control adjustment 108 may be selectively operable to control the pressure of the air exiting the controller 100 through the outlet 104. As shown in FIG. 1, and as will be discussed in more detail below, the air pressure control adjustment 108 may be slidably engaged with the housing 101 such that a user may slide the adjustment 108 laterally between different positions that affect the air pressure provided at the outlet 104 ("outlet air pressure") of the controller 100. In some examples, the housing may provide one or more reference points (e.g. hatches or markings on the housing) to allow a user to move the control adjustment 108 to a position corresponding to a particular desired pressure, or within a range of desired pressures. Although the air pressure adjustment 108 is shown as a slidably adjustable system, other adjustment devices may be used including for example a rotational knob, switch, dial, or threaded connector device. The controller 100 may also include an exhaust port 112. As will be discussed in greater detail below, air may exit the controller 100 to atmosphere through the exhaust port 112 if the air pressure at the outlet 104 exceeds a predetermined level ("exhaust air pressure").

Figure 5:
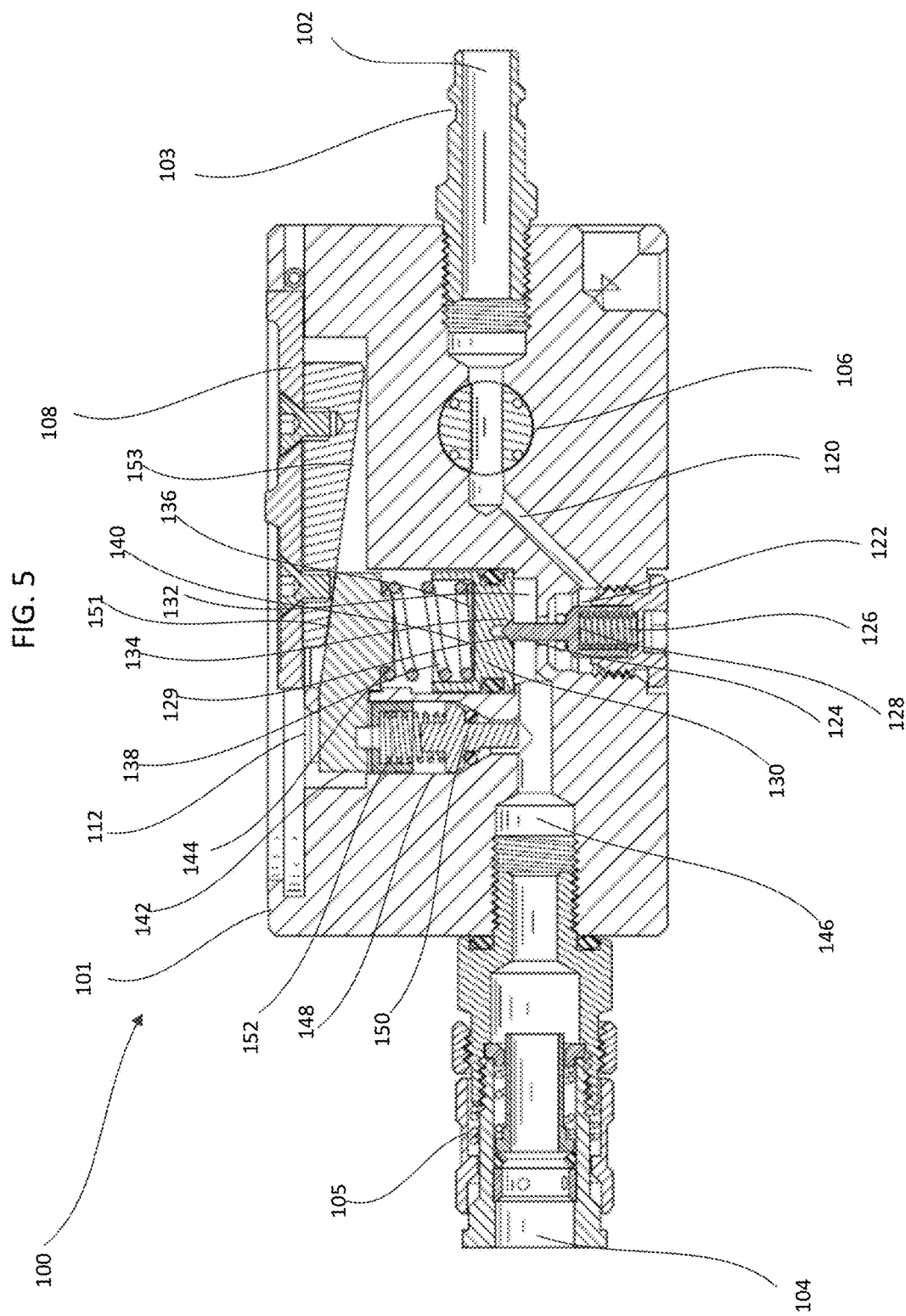
FIG. 5 depicts a cross-sectional view of an air pressure controller device according to one or more aspects described herein.

Referring now to FIG. 5, a cross-sectional view of a controller device 100 according to one or more aspects described herein is shown. As described above, during use compressed gas is supplied to the inlet 102 from a compressed gas source. The compressed gas flows from the inlet 102 through an inlet conduit 120. The inlet conduit 120 may pass through at least portions of the inlet nipple 103 and the housing 101.

In embodiments, and as shown in FIG. 5, the compressed gas flows from the inlet conduit 120 into a high pressure chamber 122. Air pressure in the inlet conduit ("inlet air pressure") may be about 25 psi to about 200 psi or about 25 psi to about 500 psi when the system is in use. The high pressure chamber 122, as shown in FIG. 5, may contain a first piston 124, or other similar device. As shown in FIG. 5, the first piston 124 may be engaged with a first compression element 126 at a first end 128. The first compression element 126 may be engaged with the first piston 124 at a first end and engaged with a portion of the housing 101 or high pressure chamber 122 at a second end. The first compression element 126 may exert a force against the piston 124, and as shown in FIG. 5, this may be a generally upward force. The first compression element 126 may be any device capable of providing a force against the first piston 124. In some embodiments, for example, the first compression element 126 may be a coil spring. Further, those of ordinary skill in the art will recognize that the first compression element 126 may be embodied with any spring properties (e.g. any spring constant, and the like), without departing from the scope of the disclosures described herein.

The first piston 124 may be engaged at a second end 129 (opposite the first compression element 128) with a second piston 130. The second piston 130, may be located primarily in a second or low pressure chamber 132 and may likewise be engaged at a first end 134 of the second piston 130 with the first piston 124. The second piston 130 may be engaged at a second end 136 with a second compression element 138. The second compression element 138 may have a first end 140 and a second end 144 and may be engaged at the first end 140 with the second piston 130 and with an adjustment block 142 at the second end 144.

The second compression element 138 may exert a force acting against the second piston 130, and as shown in FIG. 5, this may be a substantially downward force. The second compression element 138 may be any device capable of providing a force against the second piston 130. In some embodiments, for example, the second compression element 138 may be a coil spring. Further, those of ordinary skill in the art will recognize that the second compression element 138 may be embodied with any spring properties (e.g. any spring constant, and the like), without departing from the scope of the disclosures described herein FIG. 5 depicts the first piston 124 in a closed position. In an opened position the first piston 124 moves generally downward as shown FIG. 5 which allows a fluid connection to open between the high pressure chamber 122 and the low pressure chamber 132. The counteracting forces of the first and second compression elements 126, 138 along with the compressed air in the high pressure chamber 122 act to restrict the pressure of air flow entering the low pressure chamber 132. During use, an equilibrium may be reached wherein a substantially steady outlet air pressure exits the low pressure chamber 132. Air exiting the low pressure chamber then travels through an outlet conduit 146 which may pass through at least portions of the housing 101 and the outlet coupling 105 to the outlet 104. As will be discussed in greater detail below, the air pressure exiting the outlet 104 may be selectively adjusted by a user. In some embodiments the air pressure at the outlet may be in the range of about 0 psi to about 15 psi or in the range of about 0 psi to about 25 psi.

In some embodiments, as described above, the controller 100 may include an exhaust port 112. The exhaust port 112 may be fluidly connected to the outlet conduit 146 through an exhaust conduit 148. The exhaust conduit 148 may include an exhaust piston 150 or other device configured to selectively allow air to travel through the exhaust conduit 148 and out the exhaust port 112 if a pressure exists in the outlet conduit 146 that is greater than a predetermined air pressure value. This may occur, for example, if a load supported by a strut shifts which may cause a higher force on the strut. In some embodiments, the controller 100 may be configured to vent air out of the exhaust port 112 to atmosphere.

As shown in FIG. 5, the exhaust piston 150 may be engaged with an exhaust compression element 152. The exhaust compression element 152 may also be engaged with the adjustment block 142. As shown in FIG. 5, in some embodiments, the exhaust compression element 152 may exert a force on the exhaust piston 150, which as shown in FIG. 5 is in a substantially downward direction. The exhaust compression element 152 may be any device capable of providing a force against the exhaust piston 150. In some embodiments, for example, the exhaust compression element 152 may be a coil spring. Further, those of ordinary skill in the art will recognize that the exhaust compression element 152 may be embodied with any spring properties (e.g. any spring constant, and the like), without departing from the scope of the disclosures described herein.

The force exerted by the exhaust compression element 152 may under normal operating conditions act to keep the exhaust conduit 148 substantially closed. However, if the pressure within the outlet conduit 146 becomes greater than a predetermined level, the force exerted by the exhaust spring 152 may be overcome by the pressure in the outlet conduit 146, allowing air from the outlet conduit 146 to exit through the exhaust conduit 148 and exhaust port 112. Once the pressure within the outlet conduit 146 has reduced to below the predetermined level, the exhaust piston 150 may return to a closed position. As described herein, in some examples, by selecting a position of the adjustment block 108, the user may, by setting the height of the adjustment block, establish the amount of force needed to open the exhaust conduit. Thus, in some examples, a user may establish a desired pressure within the low pressure chamber, that will pressurize any component, (such as a strut) connected to the outlet, but still allow the relief of any pressure over the desired pressure, or any pressure over a second, higher pressure, if, for example, an object shifts to put additional weight upon the strut.

As described above, the pressure of air exiting the outlet 104 of the controller 100 may be selectively adjusted. The adjustment of the outlet pressure may be accomplished in some embodiments, as shown in FIG. 5, primarily through the adjustment block 142 and the air pressure control adjustment 108. As shown in FIG. 5, and as described above, the adjustment block 142 may be engaged with the second compression element 138, and the second compression element 138 is also engaged with the second piston 130. The outlet pressure may be adjusted by increasing or decreasing the force exerted by the second compression element 138 on the second piston 130. As shown in FIG. 5, adjusting the force exerted by the second compression element 138 on the second piston 130 may be accomplished by moving the adjustment block 142. In some embodiments, and as shown in FIG. 5, moving the adjustment block 142 in a generally upward direction (by, as shown in the example of FIG. 5, air pressure control adjustment 108 towards the inlet 102 so the slanted surface allows the adjustment block 142 to move upward) may reduce the force exerted by second compression element 138 on the second piston 130 which may decrease the air pressure at the outlet by reducing the pressure on the first piston 130, and therefore lowering the amount of air entering from the high pressure chamber 132. Conversely, in some embodiments, and as shown in FIG. 5, moving the adjustment block 142 in a generally downward direction may increase the force exerted by second compression element 138 on the second piston 130 which may increase the air pressure at the outlet. In these examples, a user can establish a desired pressure within the low pressure chamber such that there is enough pressure to automatically provide the readjustment and extension of a connected strut if an object is lifted or shifted, for example by providing enough pressure to lift a extending or telescoping portion of a strut until it is again in contact with a lifted object. Thus, a user may advantageously select a pressure using the pressure control adjustment 108 sufficient to lift the telescoping portion of a strut (e.g. by moving the adjustment 108 to a position indicated on the housing to correspond to that pressure), for example around 10 psi, and not have to make continual, manual readjustments using pressure equipment to readjust the strut length as an object shifts or is being lifted. Rather, a single, quick motion is all that is needed, which may allow the user, e.g. a first responder at an accident site, to address other time sensitive matters. At the same time, if a user desires the manually control the extension, the controller allows the simple and controlled readjustment of an internal pressure within a strut as needed.

In some embodiments, and as shown in FIG. 5, movement of the adjustment block 142 in a generally upward or downward directions may be accomplished by moving the air pressure control adjustment 108 laterally. For example, as shown in FIG. 5, the adjustment block 142 is engaged with the air pressure control adjustment 108. As a user moves the air pressure control adjustment 108 laterally toward or away from the adjustment block 142, the adjustment block 142 will move toward or away from the second compression element 138. This movement may change the force exerted by the second compression element 138 and thus change the pressure at the outlet 104 of the controller 100. As shown in FIG. 5, the adjustment block 142 and the air pressure control adjustment 108 may have corresponding inclined or declined surfaces 151 and 153. Although a slidable air pressure control adjustment 108 is shown in FIG. 5, other air pressure control adjustment systems may be used. For example, the air pressure control adjustment may be a rotatable device that may include a threaded connection whereby rotation of the air pressure control adjustment may move the adjustment block 142 in generally upward or downward directions. Still other example shapes and corresponding structures may be used, and the connections between the block 142 and control adjustment 108 may be direct or indirect.

As shown in FIG. 5 above, the adjustment block 142 may also be engaged with the exhaust compression element 152. Similarly, as described above, with regard to the second compression element 138, movement of the adjustment block 142 (by adjusting the air pressure control adjustment 108) may also adjust the force exerted by the exhaust compression element 152 on the exhaust piston 150. This can increase or decrease the pressure at which air exits the controller 100 through the exhaust port 112.

Furthermore, those of ordinary skill in the art will recognize that the described elements of the controller 100, as well as any other elements described in this disclosure, may be constructed using any material. For example, one or more components of the controller 100 may be constructed using a metal, an alloy, a ceramic, a fiber-reinforced material, a thermoplastic, or a wood, or combinations thereof.

FIGS. 6-10 depict another example air pressure controller 200, wherein like reference numerals refer to the same or similar elements in controller 100 but include 200 series reference numerals.

FIGS. 6-9 depict external views another exemplary air pressure controller 200 according to this disclosure. The air pressure controller 200 may include a housing 201 having an air inlet 202, an air inlet fitting or nipple 203, an air outlet 204, and an air outlet fitting or coupling 205. The housing 201 as shown in FIGS. 6-9 is substantially cuboidal in shape. However, the housing 201 may be embodied with alternative geometries without departing from the scope of the disclosures herein including, for example, prismoidally shaped.

Similar to the example 100 described above, during use the air inlet 202 may be fluidly engaged with a compressed air device that may provide one or more compressed gases (e.g. air, oxygen, nitrogen, helium, among others) to the controller 200. Additionally, as will be described in more detail below, during use the air outlet 204 may be fluidly engaged with a strut, hydraulic ram, or other device that may be used to support or brace a structure.

The compressed gas may be fluidly connected between the compressed air device, the controller 200, and strut through, for example, gas lines or compressed air hoses. The inlet nipple 203 and outlet coupling 205 may be configured to receive a coupling device such as coupling devices used with compressed air hoses. As such, various configurations of the inlet nipple 203 and the outlet coupling 205 (e.g. industrial standard air coupling configurations, among others) may be utilized without departing from the scope of this disclosure. In some embodiments, the inlet and outlet fittings 203, 205 may be integral with the housing 201. In other embodiments, however, the inlet and outlet fittings 203, 205 may be separate pieces attached to the housing, for example, using a threaded connector.

The controller 200 may also include a switch 206. The switch 206 may be selectively operable to allow air through the controller 206. The switch 206 may be have an "on" position wherein air from the air inlet 202 may travel through the controller 200 and an "off" position wherein air from the air inlet 202 does not travel through the controller 200. Although the switch 206 is shown as a rotational switch any suitable device may be used including, for example, a toggle switch.

Figure 6:
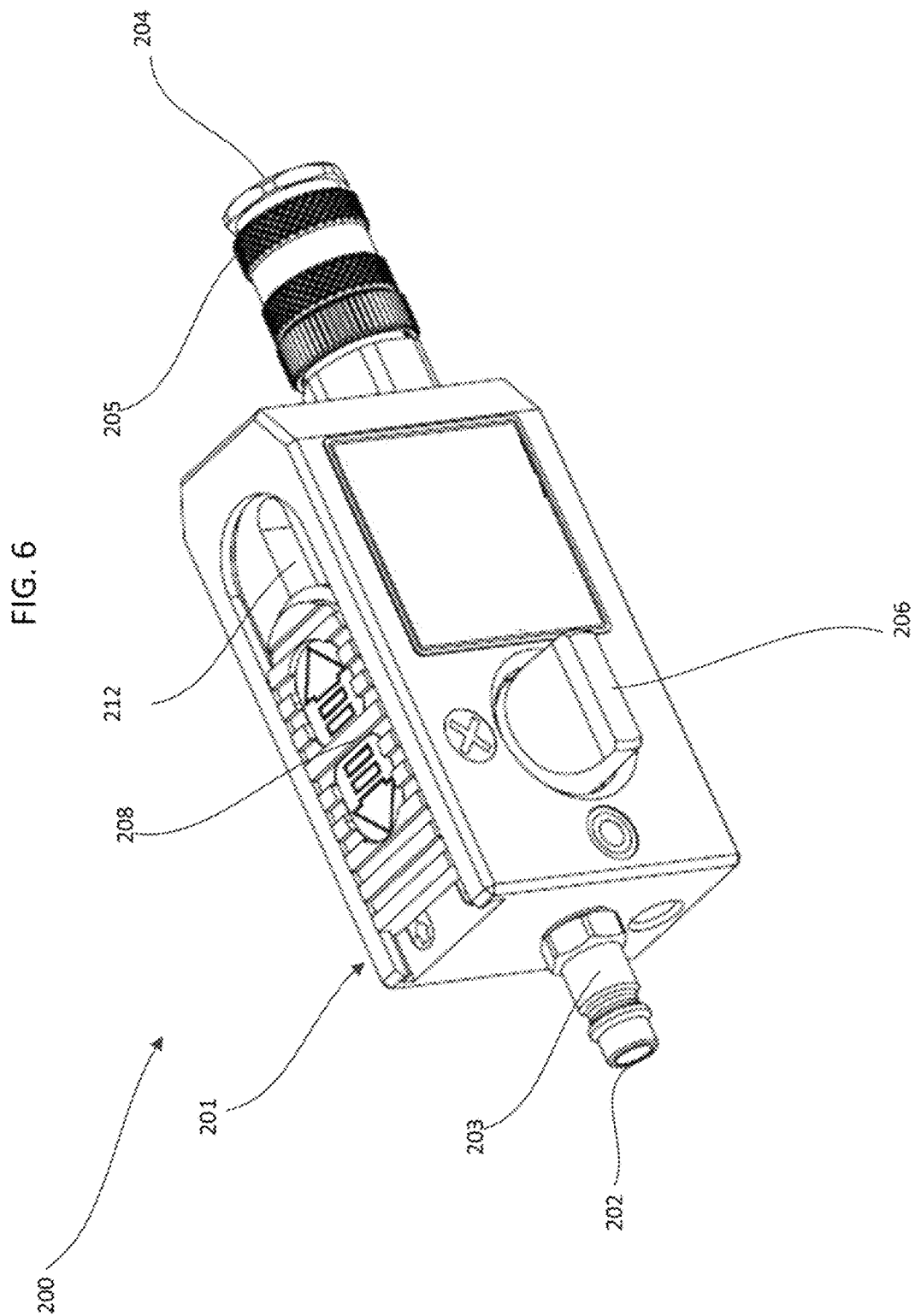
FIG. 6 depicts an isometric view of an air pressure controller device, according to one or more aspects described herein.
Figure 7:
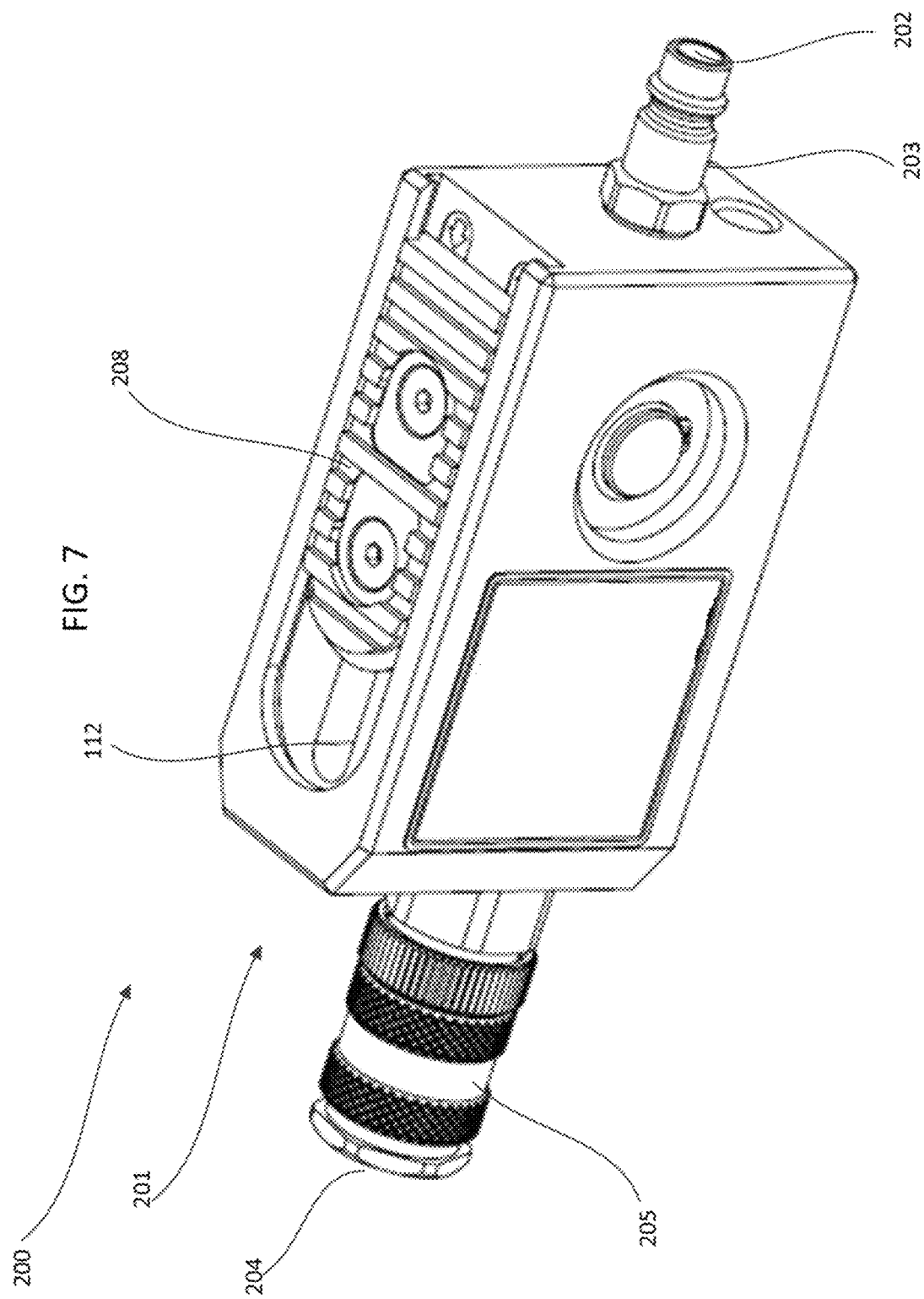
FIG. 7 depicts an isometric view of an air pressure controller device, according to one or more aspects described herein.
Figure 8:
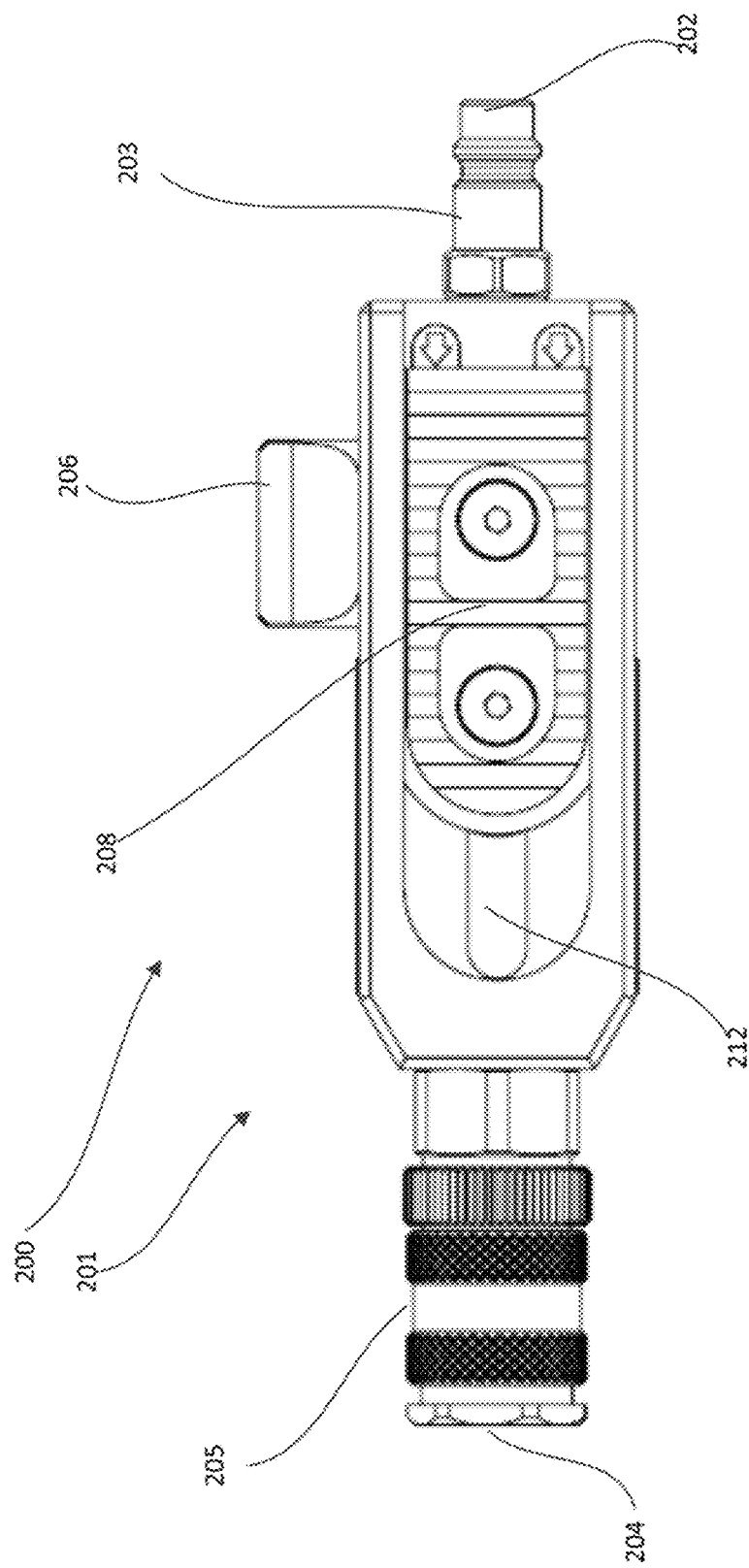
FIG. 8 depicts top view of an air pressure controller device, according to one or more aspects described herein.
Figure 9:
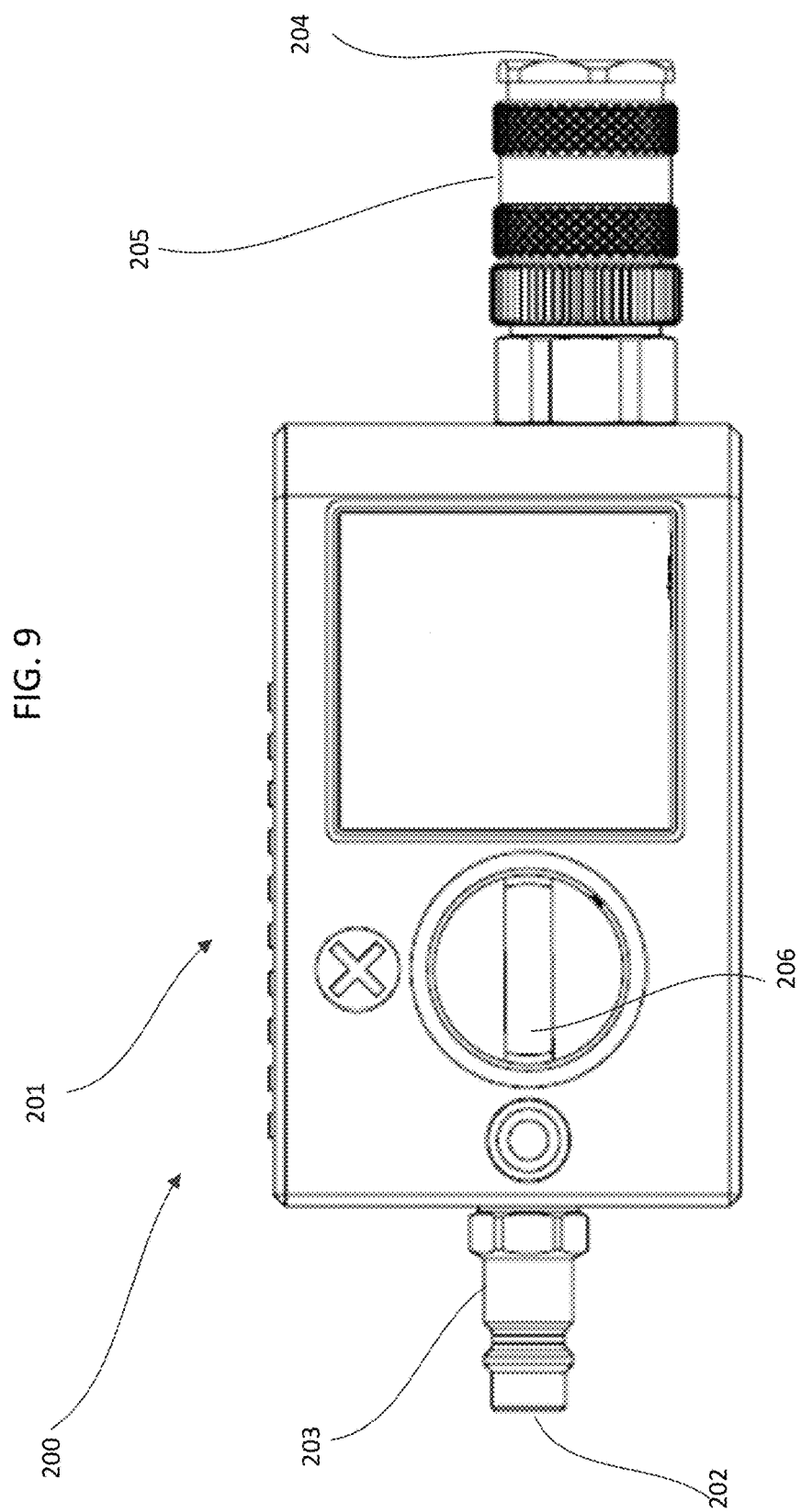
FIG. 9 depicts side view of an air pressure controller device, according to one or more aspects described herein.

The controller 200 may also include an air pressure control adjustment 208. The air pressure control adjustment 208 may be selectively operable to control the pressure of the air exiting the controller 200 through the outlet 204. As shown in FIG. 6, and as will be discussed in more detail below, the air pressure control adjustment 208 may be slidably engaged with the housing 201 such that a user may slide the adjustment 208 laterally between different positions that affect the air pressure provided at the outlet 204 ("outlet air pressure") of the controller 200. In some examples, the housing 201 may provide one or more reference points (e.g. hatches or markings on the housing) to allow a user to move the control adjustment 208 to a position corresponding to a particular desired pressure, or within a range of desired pressures. Although the air pressure adjustment 208 is shown as a slidably adjustable system, other adjustment devices may be used including for example a rotational switch, dial, or threaded connector device. The controller 200 may also include an exhaust port 212. As will be discussed in greater detail below, air may exit the controller 200 to atmosphere through the exhaust port 212 if the air pressure at the outlet 204 exceeds a predetermined level ("exhaust air pressure").

Figure 10:
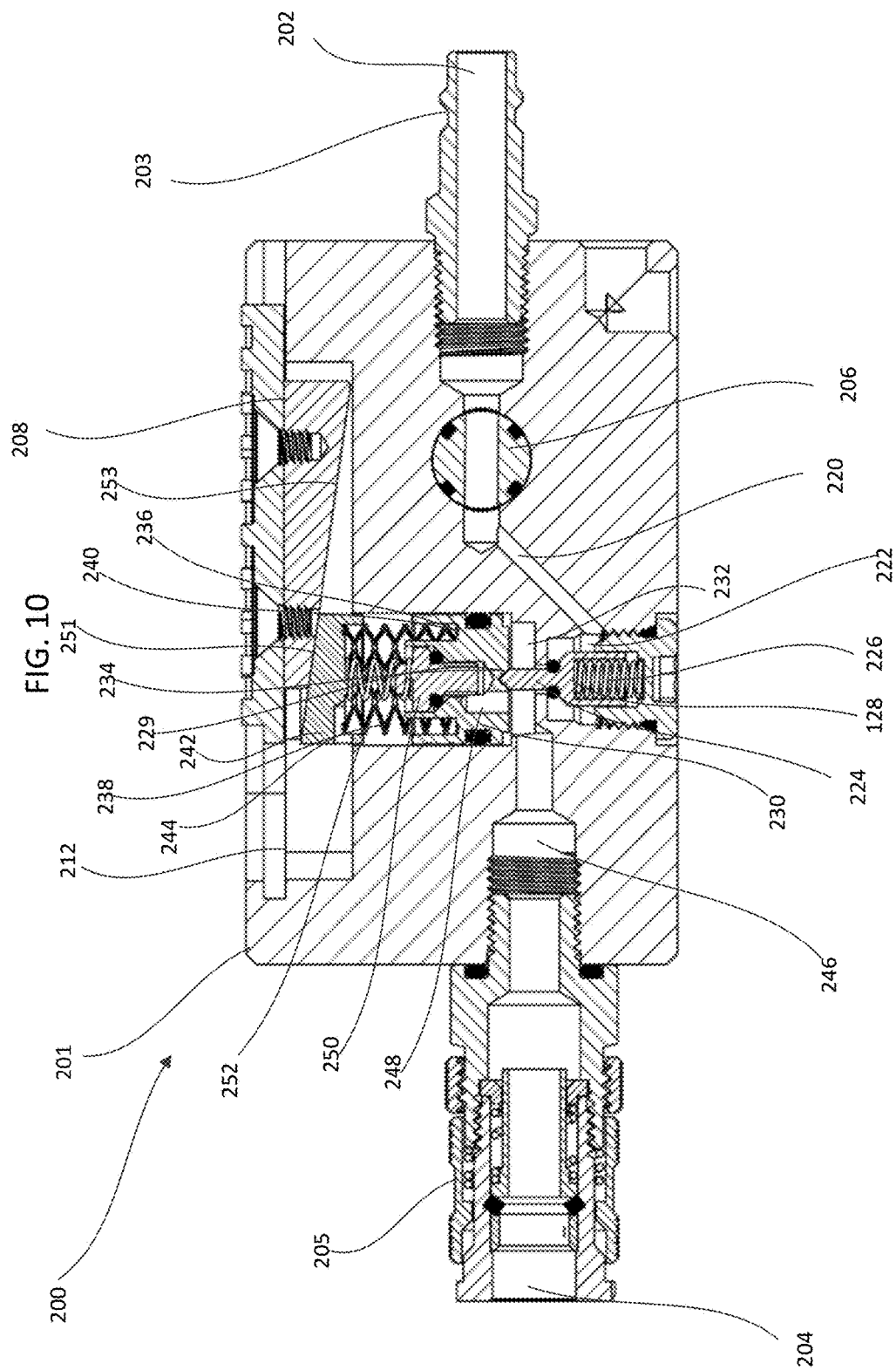
FIG. 10 depicts a cross-sectional view of an air pressure controller device according to one or more aspects described herein.

Referring now to FIG. 10, a cross-sectional view of a controller device 200 according to one or more aspects described herein is shown. As described above, during use compressed gas is supplied to the inlet 202 from a compressed gas source. The compressed gas flows from the inlet 202 through an inlet conduit 220. The inlet conduit 220 may pass through at least portions of the inlet nipple 203 and the housing 201.

In embodiments, and as shown in FIG. 10, the compressed gas flows from the inlet conduit 220 into a high pressure chamber 222. Air pressure in the inlet conduit ("inlet air pressure") may be about 25 psi to about 200 psi or about 25 psi to about 500 psi when the system is in use. The high pressure chamber 222, as shown in FIG. 10, may contain a first piston 224, or other similar device. As shown in FIG. 10, the first piston 224 may be engaged with a first compression element 226 at a first end 228. The first compression element 226 may be engaged with the first piston 224 at a first end and engaged with a portion of the housing 201 or high pressure chamber 222 at a second end. The first compression element 226 may exert a force against the piston 224, and as shown in FIG. 10, this may be a generally upward force. The first compression element 226 may be any device capable of providing a force against the first piston 224. In some embodiments, for example, the first compression element 226 may be a coil spring. Further, those of ordinary skill in the art will recognize that the first compression element 226 may be embodied with any spring properties (e.g. any spring constant, and the like), without departing from the scope of the disclosures described herein.

The first piston 224 may be engaged at a second end 229 (opposite the first compression element 228) with a second piston 230. The second piston 230, may be located primarily in a second or low pressure chamber 232 and may likewise be engaged at a first end 234 of the second piston 230 with the first piston 224. The second piston 230 may be engaged at a second end 236 with a second compression element 238. The second compression element 238 may have a first end 240 and a second end 244 and may be engaged at the first end 240 with the second piston 230 and with an adjustment block 242 at the second end 244.

The second compression element 238 may exert a force acting against the second piston 230, and as shown in FIG. 10, this may be a substantially downward force. The second compression element 238 may be any device capable of providing a force against the second piston 230. In some embodiments, for example, the second compression element 238 may be a coil spring. Further, those of ordinary skill in the art will recognize that the second compression element 238 may be embodied with any spring properties (e.g. any spring constant, and the like), without departing from the scope of the disclosures described herein FIG. 10 depicts the first piston 224 in a closed position. In an opened position the first piston 224 moves generally downward as shown FIG. 10 which allows a fluid connection to open between the high pressure chamber 222 and the low pressure chamber 232. The counteracting forces of the first and second compression elements 226, 238 along with the compressed air in the high pressure chamber 222 act to restrict the pressure of air flow entering the low pressure chamber 232. During use, an equilibrium may be reached wherein a substantially steady outlet air pressure exits the low pressure chamber 232. Air exiting the low pressure chamber then travels through an outlet conduit 246 which may pass through at least portions of the housing 201 and the outlet coupling 205 to the outlet 204. As will be discussed in greater detail below, the air pressure exiting the outlet 204 may be selectively adjusted by a user. In some embodiments the air pressure at the outlet may be in the range of about 0 psi to about 15 psi or in the range of about 0 psi to about 25 psi.

In some embodiments, as described above, the controller 200 may include an exhaust port 212. The exhaust port 212 may be fluidly connected to the outlet conduit 246 through an exhaust conduit 248. The exhaust conduit 248 may include an exhaust piston 250 or other device configured to selectively allow air to travel through the exhaust conduit 248 and out the exhaust port 212 if a pressure exists in the outlet conduit 246 that is greater than a predetermined air pressure value. This may occur, for example, if a load supported by a strut shifts which may cause a higher force on the strut. In some embodiments, the controller 200 may be configured to vent air out of the exhaust port 212 to atmosphere.

As shown in FIG. 10, the exhaust piston 250 may be engaged with an exhaust compression element 252. The exhaust compression element 252 may also be engaged with the adjustment block 242. As shown in FIG. 10, in some embodiments, the exhaust compression element 252 may exert a force on the exhaust piston 250, which as shown in FIG. 10 is in a substantially downward direction. The exhaust compression element 252 may be any device capable of providing a force against the exhaust piston 250. In some embodiments, for example, the exhaust compression element 252 may be a coil spring. Further, those of ordinary skill in the art will recognize that the exhaust compression element 252 may be embodied with any spring properties (e.g. any spring constant, and the like), without departing from the scope of the disclosures described herein.

The exhaust system (including at least the exhaust port 212, exhaust conduit 248, exhaust piston 250, and exhaust compression element 252) of the controller 200 functions similarly to the exhaust system of the controller 100 though the particular elements are placed in different locations. For example, as shown in FIG. 10, the exhaust piston 250 and exhaust compression element 252 have substantially the same center and may be centered along a line as the first piston 224, first compression element 238, the second piston 230, and second compression element 238. Additionally, the exhaust piston 250 extends into the second piston 230. Further, as shown in FIG. 10, the exhaust conduit 248 passes through the second piston 230. These differences may provide advantages which may include, for example, allowing the controller 200 to be made at a smaller size.

The force exerted by the exhaust compression element 252 may under normal operating conditions act to keep the exhaust conduit 248 substantially closed. However, if the pressure within the outlet conduit 246 becomes greater than a predetermined level, the force exerted by the exhaust spring 252 may be overcome by the pressure in the outlet conduit 246, allowing air from the outlet conduit 246 to exit through the exhaust conduit 248 and exhaust port 212. Once the pressure within the outlet conduit 246 has reduced to below the predetermined level, the exhaust piston 250 may return to a closed position. As described herein, in some examples, by selecting a position of the adjustment block 208, the user may, by setting the height of the adjustment block, establish the amount of force needed to open the exhaust conduit. Thus, in some examples, a user may establish a desired pressure within the low pressure chamber, that will pressurize any component, (such as a strut) connected to the outlet, but still allow the relief of any pressure over the desired pressure, or any pressure over a second, higher pressure, if, for example, an object shifts to put additional weight upon the strut.

As described above, the pressure of air exiting the outlet 204 of the controller 200 may be selectively adjusted. The adjustment of the outlet pressure may be accomplished in some embodiments, as shown in FIG. 10, primarily through the adjustment block 242 and the air pressure control adjustment 208. As shown in FIG. 10, and as described above, the adjustment block 242 may be engaged with the second compression element 238, and the second compression element 238 is also engaged with the second piston 230. The outlet pressure may be adjusted by increasing or decreasing the force exerted by the second compression element 238 on the second piston 230. As shown in FIG. 10, adjusting the force exerted by the second compression element 238 on the second piston 230 may be accomplished by moving the adjustment block 242. In some embodiments, and as shown in FIG. 10, moving the adjustment block 242 in a generally upward direction (by, as shown in the example of FIG. 10, air pressure control adjustment 208 towards the inlet 202 so the slanted surface allows the adjustment block 242 to move upward) may reduce the force exerted by second compression element 238 on the second piston 230 which may decrease the air pressure at the outlet by reducing the pressure on the first piston 230, and therefore lowering the amount of air entering from the high pressure chamber 232. Conversely, in some embodiments, and as shown in FIG. 10, moving the adjustment block 242 in a generally downward direction may increase the force exerted by second compression element 238 on the second piston 230 which may increase the air pressure at the outlet. In these examples, a user can establish a desired pressure within the low pressure chamber such that there is enough pressure to automatically provide the readjustment and extension of a connected strut if an object is lifted or shifted, for example by providing enough pressure to lift a extending or telescoping portion of a strut until it is again in contact with a lifted object. Thus, a user may advantageously select a pressure using the pressure control adjustment 208 sufficient to lift the telescoping portion of a strut (e.g. by moving the adjustment 208 to a position indicated on the housing to correspond to that pressure), for example around 10 psi, and not have to make continual, manual readjustments using pressure equipment to readjust the strut length as an object shifts or is being lifted. Rather, a single, quick motion is all that is needed, which may allow the user, e.g. a first responder at an accident site, to address other time sensitive matters. At the same time, if a user desires the manually control the extension, the controller allows the simple and controlled readjustment of an internal pressure within a strut as needed.

In some embodiments, and as shown in FIG. 10, movement of the adjustment block 242 in a generally upward or downward directions may be accomplished by moving the air pressure control adjustment 208 laterally. For example, as shown in FIG. 10, the adjustment block 242 is engaged with the air pressure control adjustment 208. As a user moves the air pressure control adjustment 208 laterally toward or away from the adjustment block 242, the adjustment block 242 will move toward or away from the second compression element 238. This movement may change the force exerted by the second compression element 238 and thus change the pressure at the outlet 204 of the controller 200. As shown in FIG. 10, the adjustment block 242 and the air pressure control adjustment 208 may have corresponding inclined or declined surfaces 251 and 253. Although a slidable air pressure control adjustment 208 is shown in FIG. 10, other air pressure control adjustment systems may be used. For example, the air pressure control adjustment may be a rotatable device that may include a threaded connection whereby rotation of the air pressure control adjustment may move the adjustment block 242 in generally upward or downward directions. Still other example shapes and corresponding structures may be used, and the connections between the block 242 and control adjustment 208 may be direct or indirect.

As shown in FIG. 10 above, the adjustment block 242 may also be engaged with the exhaust compression element 252. Similarly, as described above, with regard to the second compression element 238, movement of the adjustment block 242 (by adjusting the air pressure control adjustment 208) may also adjust the force exerted by the exhaust compression element 252 on the exhaust piston 250. This can increase or decrease the pressure at which air exits the controller 200 through the exhaust port 212.

Furthermore, those of ordinary skill in the art will recognize that the described elements of the controller 200, as well as any other elements described in this disclosure, may be constructed using any material. For example, one or more components of the controller 200 may be constructed using a metal, an alloy, a ceramic, a fiber-reinforced material, a thermoplastic, or a wood, or combinations thereof.

Support and/or Lifting System

As described above, a controller 100, 200 may be used in a system to brace or support an unstable structure including, for example, one or more unstable structures of a vehicle following an accident. A system for bracing or supporting a structure is schematically depicted in FIG. 11.

Additionally, as described above, a controller 100, 200 may be included in a system configured to lift or move a structure including, for example, one or more unstable structures of a vehicle following an accident. Exemplary systems for lifting or moving a structure are schematically depicted in FIGS. 12A and 12B.

Figure 11:
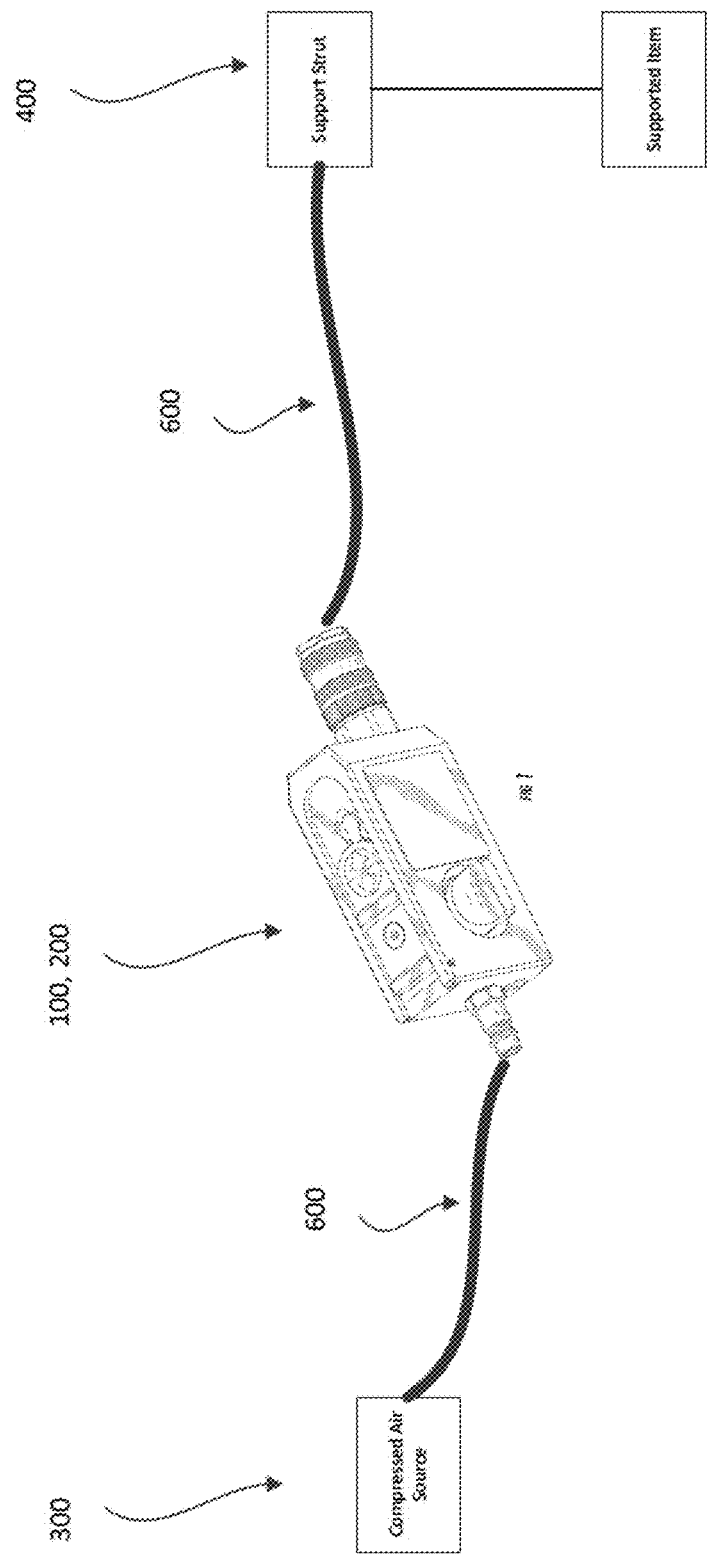
FIG. 11 depicts a supporting or bracing system including an air pressure controller device according to one or more aspects described herein.

As shown in FIG. 11, a system for bracing or supporting a structure may comprise at least one compressed air source 300, at least one controller 100, 200, and at least one support strut 400. As shown in FIGS. 12A and 12B, systems for lifting or moving a structure my comprise at least one compressed air source 300, at least one controller 100, 200, at least one support strut 400, and at least one lifting device 500. As shown in FIGS. 11 and 12 components of the system may be fluidly connected using interconnecting hoses 600 or other similar devices used to deliver pressurized gas. As such, the interconnecting hoses 600 may comprise any length or inner/outer diameters configured to handle a pressurized gas.

The support strut 400 may be any commonly known strut configured to support or move a structure. Those of ordinary skill in the art will recognize a strut 400 may generally comprise an outer housing and an extendable and/or telescoping member. The strut 400 may be selectively configurable between a fully-extended position and a contracted position. Struts 400 may be configured to engage with one or more support adapter devices, and the adapter devices may be configured to provide an interface between one or more structures/surfaces to be reinforced, and the strut 400. Thus, the first and the second support adapter devices may be configured to transmit a compressive force from a structure to be braced or moved, through to the strut 400 such that the strut 400 is compressed generally along its longitudinal axis.

The lifting device 500 may be any commonly known lifting device configured to lift or move a structure. A lifting device 500 as described herein may include, for example, an air bag, lifting bag, or other device. The lifting device 500 may in some embodiments, include a fluidly connected pressure regulator that may comprise a mechanism configured to reduce a high internal gas pressure within the gas source down to a working pressure that may be utilized to inflate the lifting device 500. Accordingly, the pressure regulator may be embodied with any specific pressure regulator designs/mechanisms, without departing from the scope of these disclosures. The lifting device 500 may also comprise one or more manually operated controls as well as one or more output meters (e.g. pressure meters) configured to allow a user to manually control flow of gas into, or out from the lifting device 500. Additionally, a safety valve, e.g., a pressure relief valve, may be included to keep the lifting device 500 in an inflated configuration when the controller mechanism, and/or the interconnecting hose, the regulator, and the source, are disconnected from the lifting device. In another example, the safety valve may be configured to relieve excess pressure within the lifting device due to shifting loads and/or temperature changes associated with the lifting device 100, 200.

With regard to the system for bracing or supporting a structure shown in FIG. 11, the controller 100, 200 may be configured to provide substantially only enough air pressure to the strut 400 to extend the strut against a structure to be braced or supported.

Similarly, with regard to systems for lifting or moving a structure as shown in FIGS. 12A and 12B, the controller 100, 200 may be configured to provide substantially only enough air pressure to the strut 400 to extend the strut against a structure to be lifted or moved. In such a system, the at least one lifting device 500 may be configured to exert substantially all of the force necessary to lift or move the structure, or at least 95% or at least 90% of the force necessary to lift or move the structure.

Other aspects of this disclosure relate to methods of stabilizing an object, or stabilizing and lifting an object, such as a vehicle. In some examples, the method comprises connecting a controller to a high pressure air source, and connecting a strut to the controller. The strut may be set up to brace an object before or after the connection to the controller. The object may then be lifted, for example using a lifting device such as a lift bag connected to the same or another high pressure air source. Prior to, concurrently, or after the lift, the controller may be adjusted to provide an internal air pressure within the strut allowing the strut to further extend to maintain or reestablish sufficient contact with the object so as to brace or support the object.

These method descriptions are merely exemplary. In certain embodiments, the method may include additional combinations or substitutions of some or all of the steps described above, or incorporate any of the controller and/or system features or aspects described herein. Moreover, additional and alternative suitable variations, forms and components for the method will be recognized by those skilled in the art given the benefit of this disclosure.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. An air pressure controller configured to reduce air pressure from a source of compressed air, the air pressure controller comprising:
    an inlet fluidly connected to an inlet conduit and a high pressure chamber;
    an outlet fluidly connected to an outlet conduit and a low pressure chamber;
    an exhaust port fluidly connected to an exhaust conduit, and the exhaust conduit fluidly connected to the outlet conduit;
    an air pressure control adjustment device configured to adjust an air pressure at the outlet to a substantially steady outlet air pressure;
    a first piston located within the high pressure chamber and extending into the low pressure chamber;
    a second piston located within the low pressure chamber;
    an adjustment block having a declined surface directly engaged with a correspondingly inclined surface of the air pressure control adjustment device, wherein the adjustment block is engaged to the second piston through a compression element, and wherein the adjustment block and the air pressure control adjustment device are configured such that generally lateral movement of the air pressure control adjustment device toward or away from the adjustment block moves the adjustment block in a generally vertical direction; and
    wherein the air pressure controller is configured to vent air through the exhaust port if an outlet conduit air pressure exceeds an exhaust air pressure.

2. The air pressure controller of claim 1, wherein the air pressure control adjustment device is configured to adjust the exhaust air pressure.

3. The air pressure controller of claim 1, wherein the outlet air pressure is less than the exhaust air pressure.

4. The air pressure controller of claim 1, wherein the air pressure control adjustment device is slidably actuatable.

5. The air pressure controller of claim 1, wherein the outlet air pressure is in a range of about 0 psi to about 15 psi.

6. The air pressure controller of claim 5, wherein the exhaust air pressure is in a range of about 0 psi to about 5 psi above the outlet air pressure.

7. The air pressure controller of claim 1, wherein the first piston is engaged at a first end with a second compression element and engaged at a second end with a second piston;
    the second piston engaged at a first end with the compression element and engaged at second end with the first piston;
    the second compression element engaged at a first end with the second piston and directly engaged at a second end with the adjustment block.

8. The air pressure controller of claim 7, further comprising;
    an exhaust piston disposed at least partially within the exhaust conduit, the exhaust piston engaged at a first end with an exhaust compression element;
    the exhaust compression element engaged at a first end with the exhaust piston and engaged with the adjustment block at a second end.

9. The air pressure controller of claim 8, wherein the each of the first piston, the second piston, and the exhaust piston are substantially centered along a line.

10. The air pressure controller of claim 9, wherein the exhaust piston extends into the second piston.

11. The air pressure controller of claim 1, wherein the exhaust conduit extends through the second piston.

12. The air pressure controller of claim 1, further comprising an on/off switch configured to selectively connect air flow from the inlet to the high pressure chamber.

13. An air pressure controller configured to reduce air pressure from a source of compressed air, the air pressure controller comprising:
    an inlet fluidly connected to an inlet conduit and a high pressure chamber;
    an outlet fluidly connected to an outlet conduit and a low pressure chamber;
    an exhaust port fluidly connected to an exhaust conduit, and the exhaust conduit fluidly connected to the outlet conduit;
    an air pressure control adjustment device configured to adjust an outlet air pressure to a substantially steady outlet air pressure;
    a first piston engaged at a first end with a first compression element and engaged at a second end with a second piston, the first piston located within the high pressure chamber and extending into the low pressure chamber;
    the second piston engaged at a first end with a second compression element and engaged at second end with the first piston;
    the second compression element engaged at a first end with the second piston and engaged at a second end with an adjustment block; wherein the adjustment block includes a declined surface directly engaged with a correspondingly inclined surface of the air pressure control adjustment device, and wherein the adjustment block and the air pressure control adjustment device are configured such that generally lateral movement of the air pressure control adjustment device toward or away from the adjustment block moves the adjustment block in a generally vertical direction; and
    wherein the air pressure controller is configured to vent air through the exhaust port if an outlet conduit air pressure exceeds an exhaust air pressure.

14. The air pressure controller of claim 13 further comprising;
    an exhaust piston disposed at least partially within the exhaust conduit, the exhaust piston engaged at a first end with an exhaust compression element;

the exhaust compression element engaged at a first end with the exhaust piston and engaged with the adjustment block at a second end.

15. The air pressure controller of claim 14, wherein the air pressure control adjustment device is configured to adjust the outlet air pressure and the exhaust air pressure.

16. The air pressure controller of claim 14, wherein the each of the first piston, the second piston, and the exhaust piston are substantially centered along a line; wherein the exhaust piston extends into the second piston; and wherein the exhaust conduit extends through the second piston.

17. The air pressure controller of claim 13, wherein the outlet air pressure is less than the exhaust air pressure.

18. A system for supporting a structure comprising:
at least one source of compressed air;
at least one strut fluidly engaged with the at least one source of compressed air;
an air pressure controller fluidly engaged with and between the at least one source of compressed air and the at least one strut, the air pressure controller configured to reduce air pressure from the at least one source of compressed air provided to the at least one strut, the air pressure controller comprising:
an inlet fluidly connected to an inlet conduit and a high pressure chamber, the inlet conduit fluidly engaged with the at least one source of compressed air;
an outlet fluidly connected to an outlet conduit and a low pressure chamber, the outlet conduit fluidly engaged the at least one strut;
an exhaust port fluidly connected to an exhaust conduit, and the exhaust conduit fluidly connected to the outlet conduit;
an air pressure control adjustment device configured to adjust an outlet air pressure to a substantially steady outlet air pressure and provide an internal pressure of the at least one strut substantially equal to the substantially steady outlet air pressure;
a first piston located within the high pressure chamber and extending into the low pressure chamber;
a second piston located within the low pressure chamber;
an adjustment block having a declined surface directly engaged with a correspondingly inclined surface of the air pressure control adjustment device, wherein the adjustment block is engaged to the second piston through a compression element, and wherein the adjustment block and the air pressure control adjustment device are configured such that generally lateral movement of the air pressure control adjustment device toward or away from the adjustment block moves the adjustment block in a generally vertical direction; and
wherein the exhaust port is configured to release air if a force is exerted on the at least one strut that is greater than a predetermined force.

19. The system of claim 18, wherein the strut comprises an extendable member configured to extend whenever the force of the structure upon the strut is less than the provided strut internal pressure.

20. The system of claim 18, further comprising at least one lifting device fluidly engaged with the at least one source of compressed air, wherein the at least one lifting device is an air bag configured to supply substantially all force necessary to lift the structure.

21. The system of claim 18, wherein the air pressure control adjustment device is slidably actuatable.

\* \* \* \* \*